(12) United States Patent
Kitayama

(10) Patent No.: US 8,308,221 B2
(45) Date of Patent: Nov. 13, 2012

(54) ROLLER ASSEMBLY FOR SLIDING VEHICLE CLOSURE

(75) Inventor: Kenichi Kitayama, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 214 days.

(21) Appl. No.: 12/582,136

(22) Filed: Oct. 20, 2009

(65) Prior Publication Data

US 2011/0089714 A1 Apr. 21, 2011

(51) Int. Cl.
*B60J 5/06* (2006.01)
*E05D 15/06* (2006.01)

(52) U.S. Cl. ............ 296/155; 296/146.9; 49/221; 16/91

(58) Field of Classification Search .................. 296/155, 296/146.9; 49/211–216
See application file for complete search history.

(56) References Cited

U.S. PATENT DOCUMENTS

| | | | |
|---|---|---|---|
| 4,268,996 A * | 5/1981 | Allen | ............................. 49/212 |
| 5,809,834 A | 9/1998 | Goldy | |
| 6,036,257 A | 3/2000 | Manuel | |
| 6,195,838 B1 | 3/2001 | Mains et al. | |
| 6,779,832 B2 | 8/2004 | D'Assumcao | |
| 6,781,058 B1 | 8/2004 | DeCicco et al. | |
| 6,926,342 B2 * | 8/2005 | Pommeret et al. | ............ 296/155 |
| 7,934,767 B2 * | 5/2011 | Kim et al. | ................ 296/190.11 |
| 2006/0043766 A1 | 3/2006 | Tanigawa | |
| 2009/0212592 A1 | 8/2009 | Takahashi | |

FOREIGN PATENT DOCUMENTS

| | | | |
|---|---|---|---|
| JP | 08200356 A | * | 8/1996 |
| JP | 2008223400 | | 9/2008 |

OTHER PUBLICATIONS

JP08-200356 Computer translation.*
International Search Report of PCT/US2010/048746 dated Nov. 18, 2010.
Written Opinion of PCT/US2010/048746 dated Nov. 18, 2010.

* cited by examiner

*Primary Examiner* — Glenn Dayoan
*Assistant Examiner* — Melissa A Black
(74) *Attorney, Agent, or Firm* — Rankin Hill & Clark LLP

(57) ABSTRACT

A roller assembly for a sliding vehicle closure includes a bracket secured to an associated sliding vehicle closure and a ball-type roller secured to the bracket at a location spaced apart from the associated sliding vehicle closure. The ball-type roller is fixed in position relative to the associated sliding vehicle closure during opening and closing thereof.

20 Claims, 7 Drawing Sheets

ROLLER ASSEMBLY FOR SLIDING VEHICLE CLOSURE

BACKGROUND

The present disclosure generally relates to a roller assembly for a sliding vehicle closure, and particularly relates to a lower roller assembly for a sliding side door of a vehicle.

One known lower roller assembly for a sliding vehicle closure, such as a sliding side door of a vehicle, includes a main bracket mounted to the sliding door and a separate roller bracket rotatably mounted to a distal end of the main bracket. The roller bracket includes a pair of guide rollers rotatable about respective generally vertical axes. The guide rollers are received in a track for guided movement therealong as the sliding door is opened and closed. A free-riding roller is also rotatably connected to the guide bracket. This roller rotates about a generally horizontally oriented axis and does not typically move within a track. Instead, this lower roller moves along a generally horizontally oriented surface of the vehicle body. As the sliding door is moved between its opened and closed positions and the upper guide rollers move along the track, the guide bracket rotates relative to the main bracket.

SUMMARY

According to one aspect, a roller assembly for a sliding vehicle closure includes a bracket secured to an associated sliding vehicle closure and a ball-type roller secured to the bracket at a location spaced apart from the associated sliding vehicle closure. The ball-type roller is fixed in position relative to the associated sliding vehicle closure during opening and closing thereof.

According to another aspect, a lower roller assembly for a sliding side door of a vehicle includes an arm extending from a lower portion of the sliding door and a roller ball mounted adjacent a distal end of the arm for supporting the sliding door on a body support surface of the vehicle.

According to still another aspect, a sliding side door of a vehicle includes a door body and a bracket extending from a lower portion of the door body. The sliding side door further includes a ball-type roller mounted to the bracket at a location spaced apart from the door body in a rotatably fixed position for supporting the door body during opening and closing thereof.

DETAILED DESCRIPTION

Figure 1:
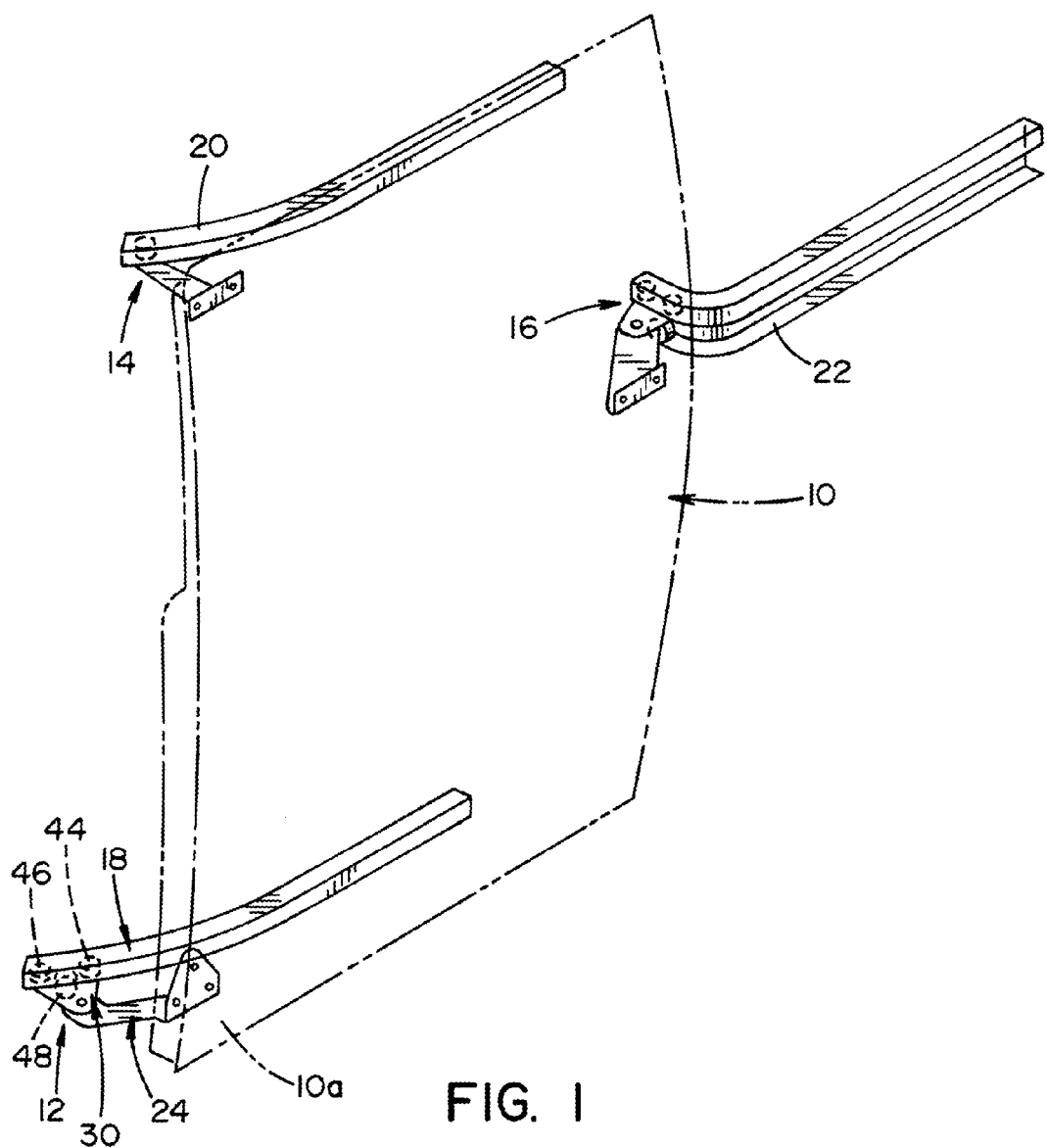
FIG. 1 is a perspective view showing a vehicle closure slidably mounted by a plurality of roller assemblies respectively received in corresponding tracks that can be mounted to a vehicle.

Referring now to the drawings, wherein the showings are for purposes of illustrating one or more exemplary embodiments and not for purposes of limiting same, FIG. 1 shows a sliding vehicle closure 10, such as a sliding side door of a vehicle, including a plurality of roller assemblies 12, 14, 16 slidably mounting the closure 10 to a vehicle via a plurality of corresponding track members 18, 20, 22. With additional reference to FIG. 2, the lower roller assembly 12 includes a bracket 24 secured to the sliding vehicle closure 10. In particular, in the illustrated embodiment, the bracket 24 can include an upstanding portion 26 that mounts flush against the vehicle closure 10 and has mounting holes 28 defined therein for receiving suitable fasteners, such as bolts (not shown). Alternatively, the bracket 24 can be secured to the vehicle closure 10 through other means, such as by welding.

A guide bracket 30 is rotatably mounted to a distal end 32 of the bracket 24. In particular, the guide bracket 30 can be rotatably mounted to the bracket 24 via journal or pivot 34 such that the guide bracket 30 is rotatable relative to the bracket 24 and the closure 10 about a generally vertical axis 36. A plurality of rollers 44, 46, 48 are rotatably mounted to the guide bracket 30. In particular, guide rollers 44, 46 are rotatably mounted to the guide bracket so as to be rotatable about respective generally vertical axes. In the illustrated embodiment, the guide roller 44 is rotatably mounted to a shaft 50 projecting upward from the guide bracket 30. Similarly, the guide roller 46 is rotatably mounted about a shaft 52 projecting upward from the guide bracket 30.

The roller 48, which can be referred to as a support roller for it bears the weight of the vehicle closure 10 (or at least bears the weight in conjunction with one or more rollers of the other roller assemblies 14 and 16), is rotatably mounted to the guide bracket 30 by a shaft 54 projecting from a downward depending flange 56. As shown, the downward depending flange 56 can be orthogonally oriented relative to the remainder of the guide bracket 30. The guide rollers 44, 46 are received within channel 58 defined by the track member 18. In particular, the track member 18 is formed as a generally inverted C-shaped member having an upper wall 18a and a pair of spaced apart downward depending sidewalls 18b and 18c. The guide rollers 44, 46 and the track member 18 are sized appropriate so that the guide rollers 44, 46 can engage the sidewalls 18b, 18c and rotate therealong as the vehicle closure 10 is moved between opened and closed positions. The lateral position of the vehicle closure 10 is guided by the guide rollers 44, 46 received within the channel 58 of the track member 18, whereas the support roller 48 moves along a generally horizontal surface 60 of the vehicle that can be disposed below the track member 18 for bearing the weight of the vehicle closure 10. As the guide rollers 44, 46 move along the track member 18, the guide bracket 30 rotates relative to the main bracket 24 as indicated by arrow 62.

Figure 3:
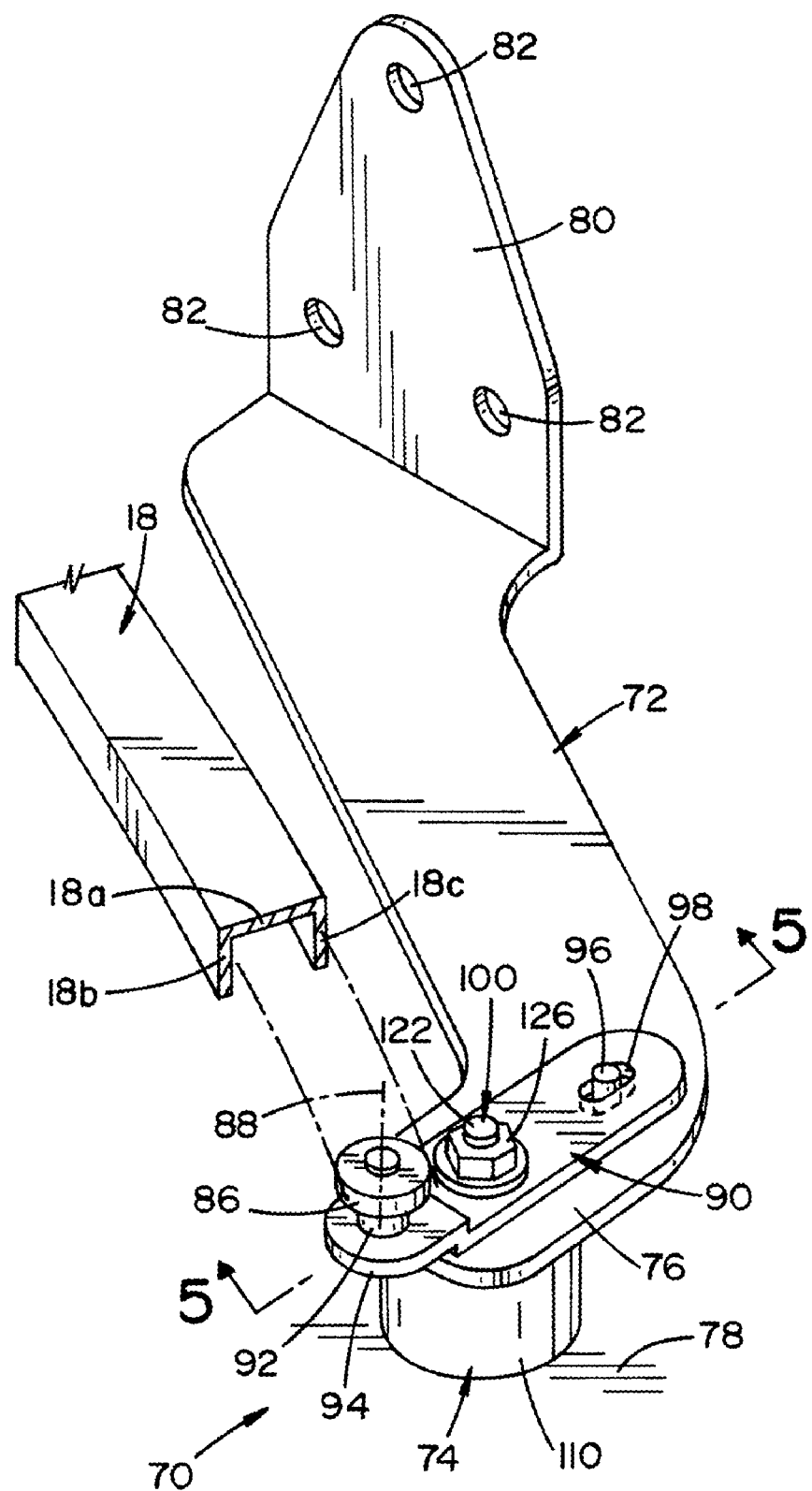
FIG. 3 is a partial perspective view, similar to FIG. 2, of an improved lower roller assembly for a sliding vehicle closure.

With reference to FIG. 3, a roller assembly 70 for a sliding vehicle closure is illustrated according to an exemplary embodiment. The roller assembly 70 can be a lower roller assembly for a sliding side door of a vehicle and thus could replace the roller assembly 12 of FIG. 1. As shown, the roller assembly 70 can include a main bracket or arm 72 secured to an associated sliding vehicle closure (e.g., sliding side door 10 of FIG. 1) and extending from a lower portion thereof (e.g., lower portion 10a). The roller assembly 70 can further include a ball-type roller 74 secured to the main bracket 72 at a location spaced apart from the sliding vehicle closure 10. For example, in the illustrated embodiment, the ball-type roller 74 is mounted adjacent a distal end 76 of the main bracket 72 for supporting the sliding door 10 on a body support surface 78 (FIG. 5) of a vehicle to which the door 10 is mounted. As will be described in more detail below, the ball-type roller 74 is fixed in position relative to the sliding vehicle closure to which it is mounted via the main bracket 72, particularly during opening and closing thereof.

In the illustrated embodiment, the main bracket 72 includes an upstanding portion 80 that can be flushly mounted against a vehicle closure, such as the sliding side door 10 of FIG. 1. The upstanding portion 80 can include mounting apertures 82 defined therein. Mounting apertures 82 can receive suitable fasteners, such as bolts (not shown), for securing the main bracket 72 to a vehicle closure, though this is not required. Alternatively, the upstanding portion 80 could be secured to a vehicle closure by other means, such as by welding. In addition, it is to be appreciated and understood by those skilled in the art that the main bracket 72 can take on other configurations and need not be constructed exactly as illustrated. For example, main bracket 72 could be an arm extending from the vehicle closure and could be integrally formed therewith.

Figure 4:
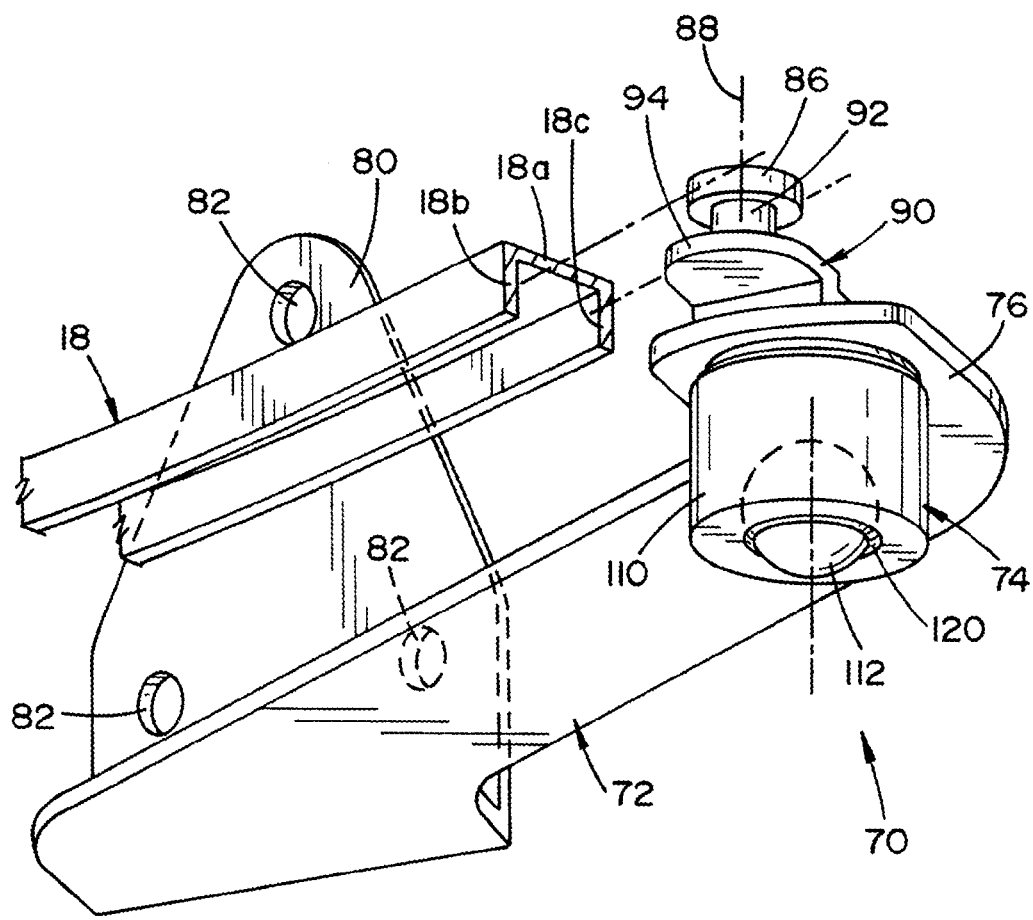
FIG. 4 is an underside perspective view of the lower roller assembly of FIG. 3.
Figure 5:
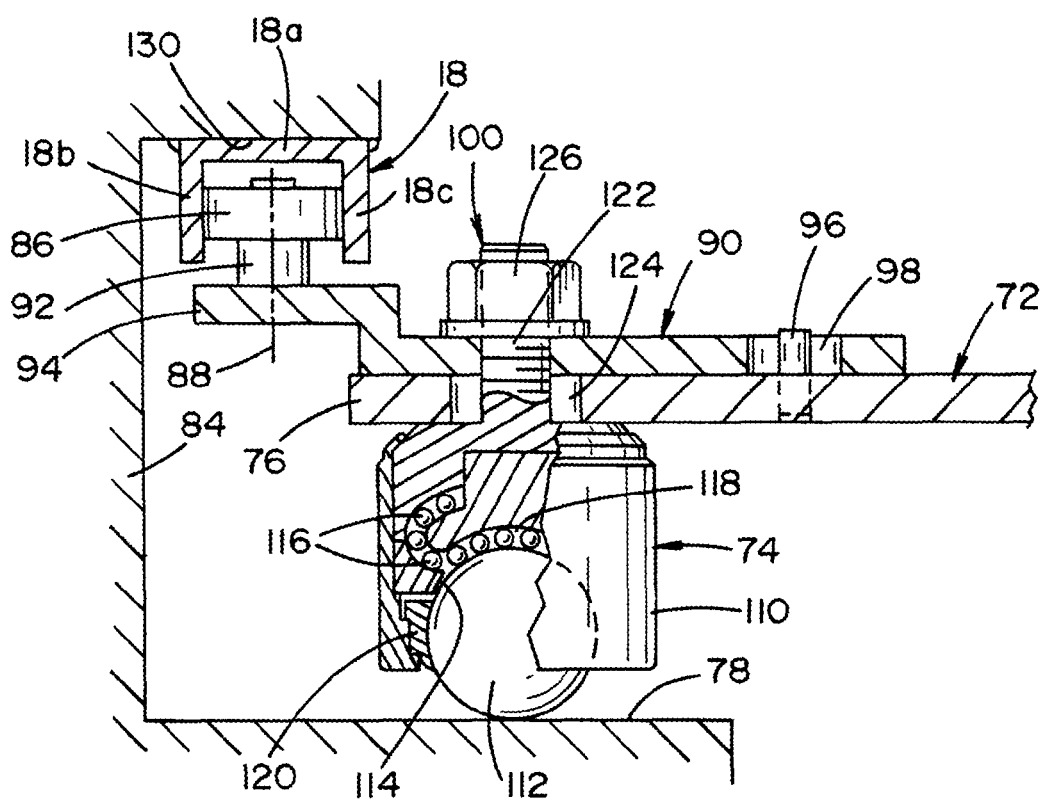
FIG. 5 is a cross sectional view of the lower roller assembly taken along the line 5-5 of FIG. 3.

With additional reference to FIGS. 4 and 5, the ball-type roller 74 of the roller assembly 70 can be a trackless ball-type roller that engages and moves along the corresponding horizontal surface 78 of an associated vehicle body 84 during opening and closing of the vehicle closure 10. That is, the ball-type roller 74 need not be received within a track, but can simply move or roll along the horizontal surface 78.

A guide roller 86 can also be secured to the bracket 72 at a location spaced apart from the sliding vehicle closure 10 and adjacent the ball-type roller 74. The guide roller is rotatable about a generally vertical axis and the guide roller 86 can be received in a track, such as track 18 of FIG. 1, to guide the vehicle closure 10, particularly laterally, during opening and closing thereof. In particular, the guide roller 86 can rotate about a generally vertical axis 88 and can be received within the track member 18. As already described, the track member 18 can have a C-shape, particularly an inverted C-shape, formed by upper wall 18a and a pair of spaced apart side or lateral walls 18b, 18c, depending downwardly from the upper wall 18a. As shown, the track member 18 in which the guide roller 86 is received can be secured to a surface 130 of the vehicle body 84 that is provided opposite the surface 78, though this is not required. The track member 18 can be secured to the vehicle body 84 in any suitable manner, such as welding. The track member 18 and the guide roller 86 can be appropriately sized so that the guide roller 86 engages both sidewalls 18b and 18c and rolls therealong during opening and closing movement of the vehicle closure 10.

Figure 2:
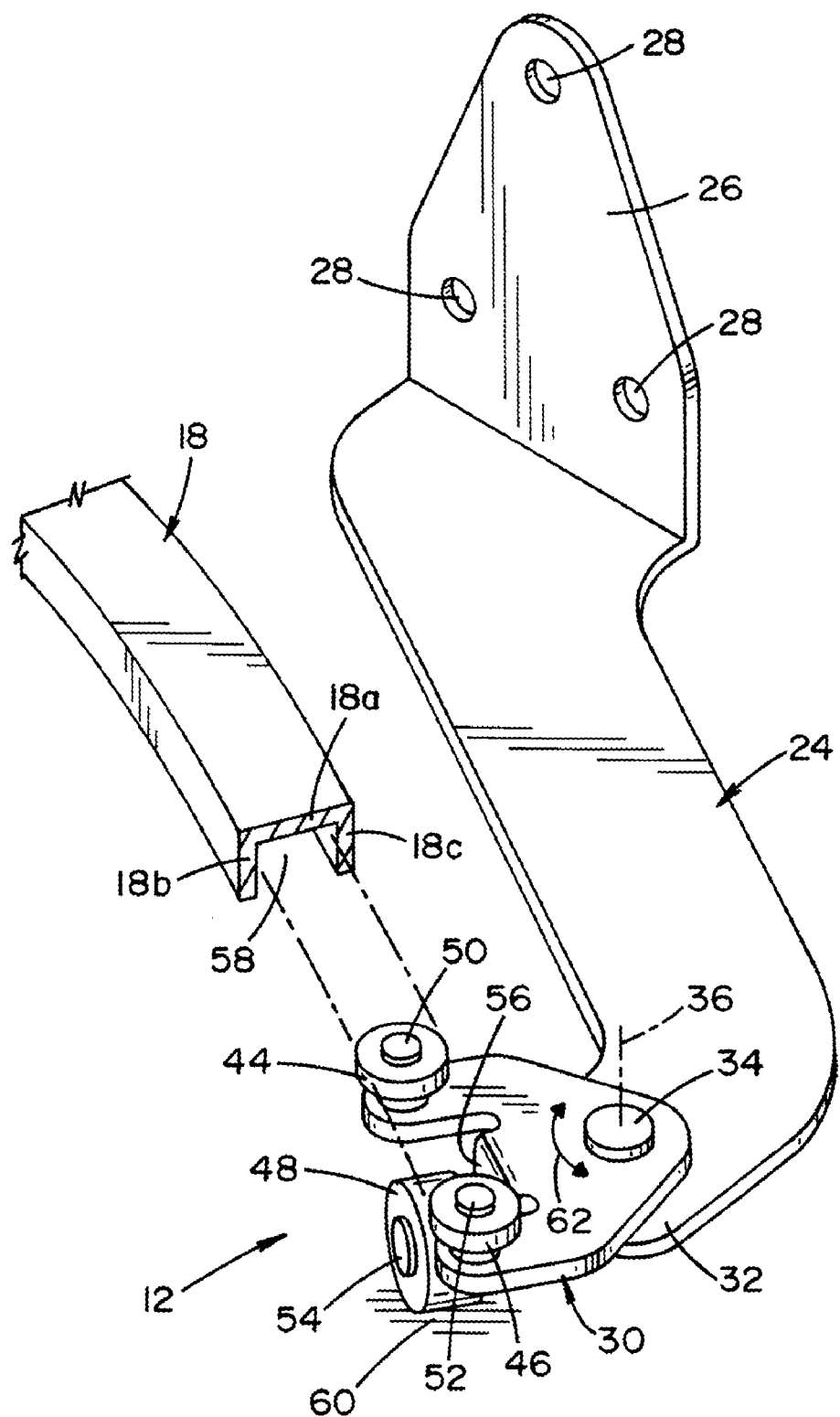
FIG. 2 is a perspective view of the lower roller assembly of FIG. 1 and its corresponding track shown with a portion of the track removed.

Unlike the roller assembly 12 of FIGS. 1 and 2, the guide roller 86 of the roller assembly 70 is fixed in position relative to the bracket 72 and relative to the sliding vehicle closure 10 to which the bracket 72 is secured, including during opening and closing of the vehicle closure 10. More specifically, in the illustrated embodiment, the guide roller 86 is rotatably secured to a guide roller bracket 90 that is fixed in position relative to the main bracket 72 and thus relative to the sliding vehicle closure 10, including during opening and closing thereof. For fixing the position of the guide roller 86, which is rotatably mounted to the guide bracket 90 by shaft 92 projecting upward from an end portion 94 of the guide bracket, the guide roller bracket 90 is non-rotatably fixed to the main bracket 72. As shown in the illustrated embodiment, the end portion 94 of the guide bracket 90 can be a stepped or raised portion relative to a remainder of the bracket.

To nonrotatably fix the guide bracket 90 relative to the main bracket 72, the main bracket 72 can included a raised boss 96 that is received in an aperture 98 defined in the guide roller bracket 90 to prevent rotation of the guide roller bracket 90 and thus the guide roller 86 rotatably secured thereto relative to the bracket 72 and the vehicle closure 10. As shown, the guide roller bracket 90 can be secured to the main bracket 72 by a fastener, such as illustrated threaded fastener 100. The aperture 98 of the guide roller bracket 90 can be a slot to allow linear adjustment of a relative position of the guide roller 86 relative to the main bracket 72 when the fastener 100 is loosened. However, the fastener 100 is generally tightened after the relative position is set and remains tightened during opening and closing of the vehicle 10.

The ball-type roller 74 can include a housing 110 mounted to the bracket 90. A ball member 112 can be received within a recess 114 defined by the housing 110 and a plurality of ball bearings 116 can be disposed between the housing 110 and the ball member 112. The ball-type roller 74 and its ball member 112 are thus nonmovably mounted to the main bracket 72 so as to remain in a fixed position during opening and closing of the sliding door 10. As is known and understood by those skilled in the art, the recess 114 can include a further recessed portion 118 for accommodating the ball bearings 116. In addition, a grommet 120 (or like member) can be disposed within an open end of the housing 110 for securing the ball member 112 to the housing 110. In this manner, the ball member 112 is secured to a lower end of the vehicle closure 10 for supporting the closure 10 relative to the vehicle body 84.

As shown in the illustrated embodiment, the housing 110 can include a threaded portion or shaft 122 that is received through a slotted aperture 124 of the main bracket 72. A nut 126 can threadally engage the threaded portion 122 to form the fastener 100 and thereby secure the ball-type roller 74 to the main bracket 72. The slotted aperture 124 allows the linear adjustment of the guide roller 86 relative to the main bracket 72 in the manner already described (i.e., while the fastener 100, and particularly the nut 126, is loosened). As shown, the ball member 112 can roll along the body support surface 78, which can be configured as a generally horizontal surface of the vehicle. By this arrangement, the ball-type roller 74 and its ball member 112 support the sliding door 10 relative to the body support surface 78 and more generally the vehicle body 84.

Figure 6:
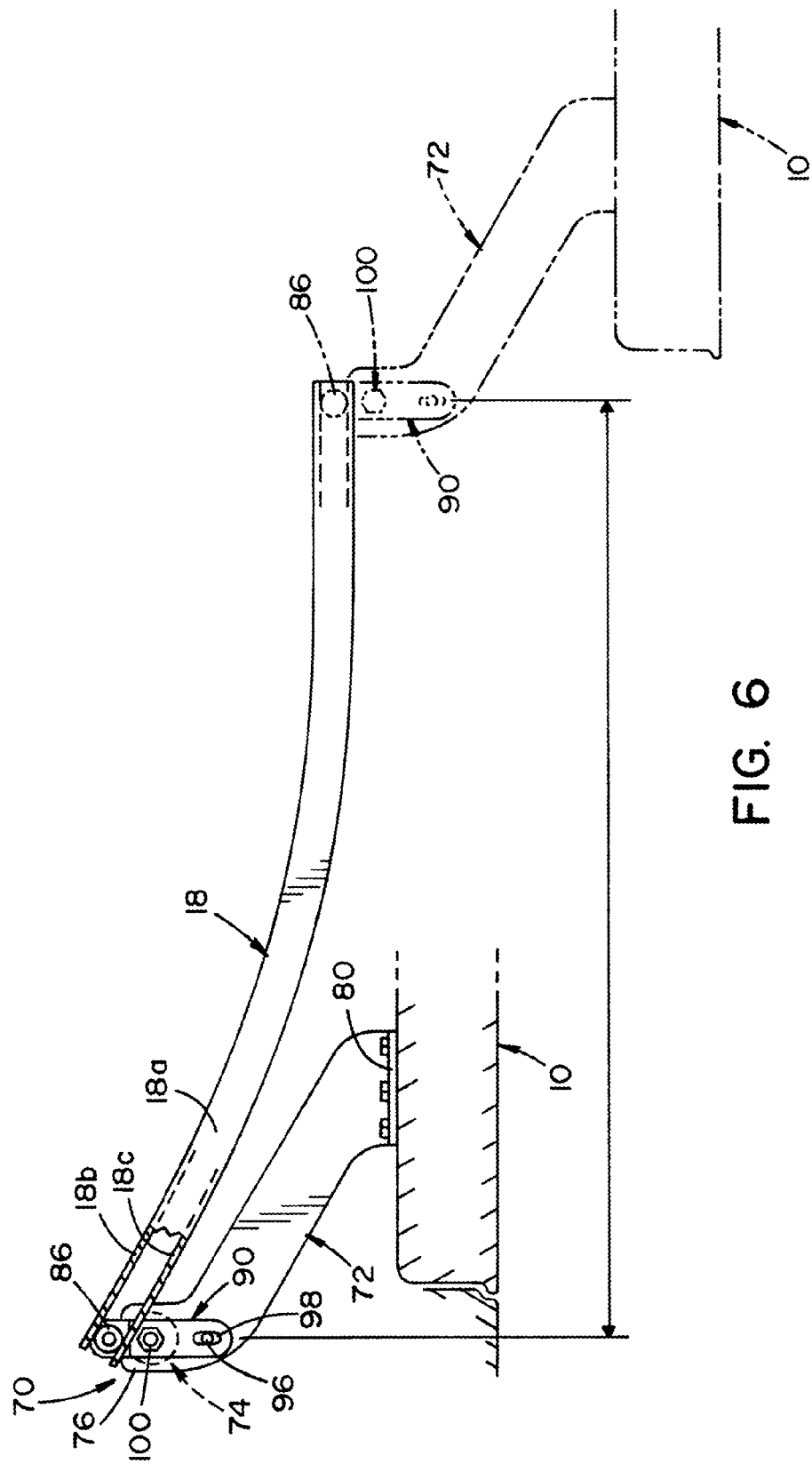
FIG. 6 is a schematic plan view showing how the lower roller assembly of FIGS. 3-5 moves along its corresponding track.
Figure 7:
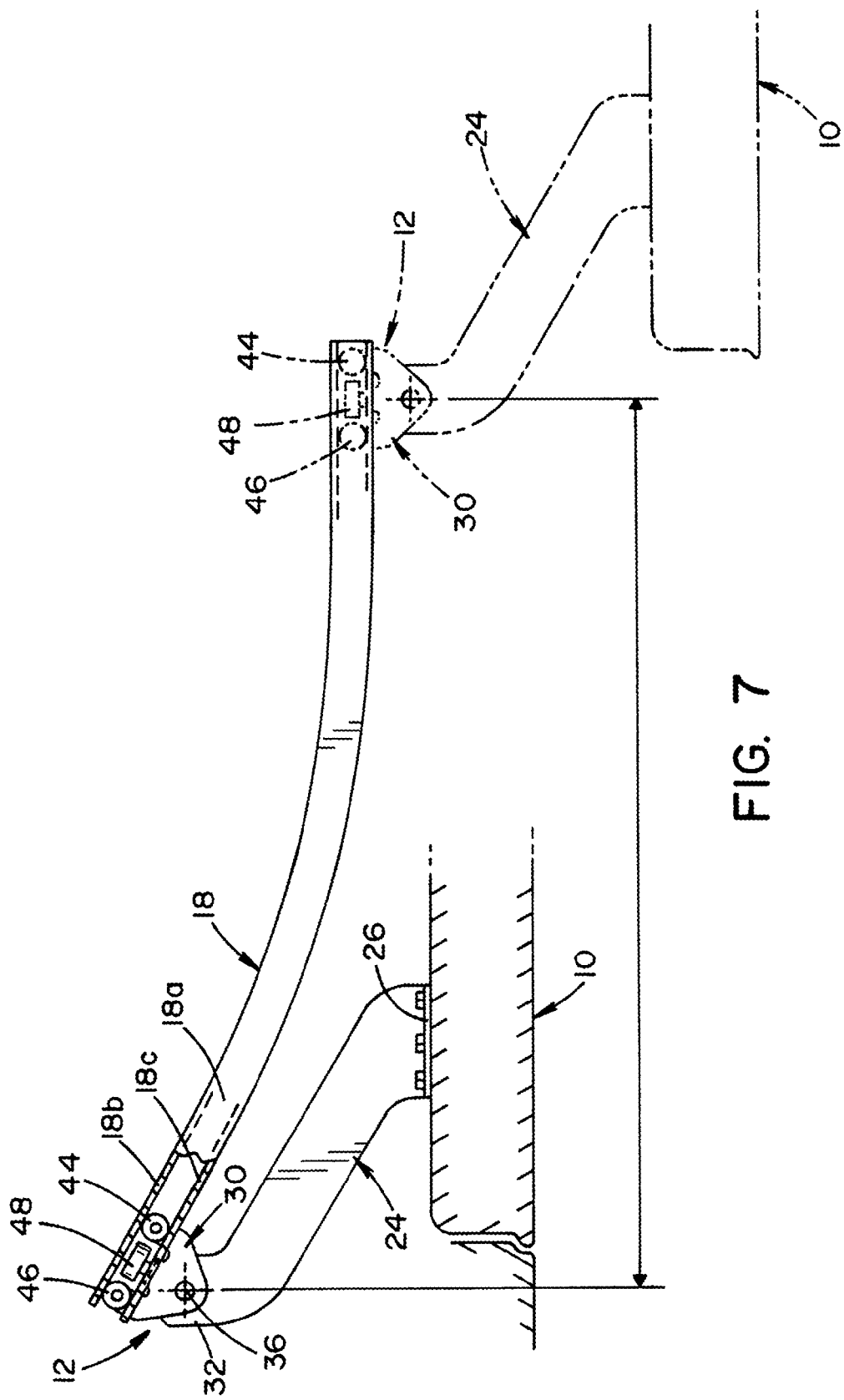
FIG. 7 is a schematic plan view showing how the lower roller assembly of FIG. 2 moves along its corresponding track.

With reference to FIGS. 6 and 7, movement of the lower roller assemblies 12 and 70 are illustrated. In particular, FIG. 7 shows closure 10 having lower roller assembly 12 being moved between an open and a closed position. As illustrated, the guide roller bracket 30 rotates relative to the main bracket 24 and the closure 10 as the closure is moved. In contrast, FIG. 6 shows the closure 10 having lower roller assembly 70 being moved between an open and a closed position. As illustrated, the guide roller bracket 90 remains in a fixed position relative to the main bracket 72 and the closure 10 and the closure is moved. This advantageously permits an improvement of the layout required for the track member 18. In particular, the track member 18 can have a reduced length when the roller assembly 70 is used. An additional benefit is a weight reduction when the roller assembly 70 is used due, at least in part, to a reduction in size in the guide roller bracket 90, a reduced length of the track member 18, and a reduced size of the overall body structure. An alternative benefit includes a potentially increased sliding distance for the sliding closure 10.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A roller assembly for a sliding vehicle closure, comprising:
   a bracket secured to an associated sliding vehicle closure;
   a ball-type roller secured to said bracket at a location spaced apart from the associated sliding vehicle closure, said ball-type roller fixed in position relative to the associated sliding vehicle closure during opening and closing thereof; and
   a guide roller secured to said bracket at a location spaced apart from the associated sliding vehicle closure and adjacent and laterally spaced apart in the vehicle width direction to said ball-type roller, wherein said guide roller is received in a track to guide the associated vehicle closure during opening and closing thereof.

2. The roller assembly of claim 1 wherein said ball-type roller is a trackless ball-type roller that engages and moves along a corresponding surface of an associated vehicle body during opening and closing of the associated vehicle closure.

3. The roller assembly of claim 1 wherein said guide roller rotates about a generally vertical axis and said track has a C-shape formed by an upper wall and a pair of spaced apart lateral walls depending downwardly from said upper wall.

4. The roller assembly of claim 1 wherein said guide roller is fixed in position relative to the associated sliding vehicle closure during opening and closing thereof.

5. The roller assembly of claim 4 wherein said guide roller is rotatably secured to a guide roller bracket that is fixed in position relative to the associated sliding vehicle closure during opening and closing thereof.

6. The roller assembly of claim 1 wherein said ball-type roller includes a housing mounted to said bracket, a ball member received within a recess defined by said housing and a plurality of ball bearings facilitating relative rotation of said ball member relative to said housing.

7. The roller assembly of claim 1 wherein the ball-type roller is secured to a lower end of the associated vehicle closure for supporting the associated vehicle closure relative to an associated vehicle body.

8. The roller assembly of claim 1 wherein a guide roller is secured to said bracket at a location spaced apart from the associated sliding vehicle closure and adjacent said ball-type roller, said guide roller fixed in position relative to the associated sliding vehicle closure during opening and closing thereof and rotatably secured to a guide roller bracket that is fixed in position relative to the associated sliding vehicle closure during opening and closing thereof, wherein said guide roller bracket is nonrotatably fixed to said bracket.

9. A roller assembly for a sliding vehicle closure, comprising:
   a bracket secured to an associated sliding vehicle closure; and
   a ball-type roller nonmovably mounted to said bracket at a location spaced apart from the associated sliding vehicle closure, said ball-type roller fixed in position relative to the bracket and the associated sliding vehicle closure during opening and closing thereof; and
   a guide roller is secured to said bracket at a location spaced apart from the associated sliding vehicle closure and adjacent said ball-type roller, said guide roller fixed in position relative to the associated sliding vehicle closure during opening and closing thereof and rotatably secured to a guide roller bracket that is fixed in position relative to the associated sliding vehicle closure during opening and closing thereof, and
   wherein said guide roller bracket is nonrotatably fixed to said bracket.

10. The roller assembly of claim 9 wherein said bracket includes a raised boss that is received in an aperture defined in said guide roller bracket to prevent rotation of said guide roller bracket and said guide roller rotatably secured thereto relative to said bracket.

11. The roller assembly of claim 10 wherein said guide roller bracket is secured to said bracket by a fastener and said aperture of said guide roller bracket is a slot allowing linear adjustment of a relative position of said guide roller relative to said bracket when said fastener is loosened.

12. A lower roller assembly for a sliding side door of a vehicle, comprising:
   an arm extending from a lower portion of the sliding door;
   a roller ball fixedly mounted adjacent a distal end of said arm for supporting the sliding door on a body support surface of the vehicle and for remaining in a fixed location to the sliding door during opening and closing thereof; and
   a guide roller where a rotational axis of the guide roller is laterally spaced apart in the vehicle width direction in relation to a rotational axis of the roller ball, the guide roller rotatably secured to a guide roller bracket, the guide roller bracket being nonrotatably fixed to said distal end of said arm, thereby preventing rotation of the guide roller and the guide roller bracket relative to the sliding door.

13. The lower roller assembly of claim 12 wherein said body support surface is generally a horizontal surface of the vehicle and said roller ball supports the sliding door relative to said body support surface.

14. The lower roller assembly of claim 13 wherein said guide roller is received in a track, said guide roller guiding lateral movement of the sliding side door during opening and closing thereof without bearing any weight of the sliding side door, said roller ball bearing the weight of the sliding side door without guiding lateral movement of the sliding door.

15. The lower roller assembly of claim 14 wherein said track has an inverted C-shape.

16. The lower roller assembly of claim 12 wherein said roller ball is nonmovably mounted to said arm so as to remain in a fixed position during opening and closing of the sliding door.

17. The roller assembly of claim 12 wherein the guide roller is received in a track to guide the sliding door during opening and closing thereof.

18. A sliding side door of a vehicle, comprising:
   a door body;
   a bracket extending from a lower portion of said door body, wherein said bracket includes a raised boss;
   a ball-type roller mounted to said bracket at a location spaced apart from said door body in a rotatably fixed position for supporting said door body during opening and closing thereof; and
   a guide roller mounted to said bracket, said guide roller rotatably secured to a guide roller bracket that is fixed in position relative to said door body during opening and closing thereof, and wherein an aperture is defined in said guide roller bracket to receive the raised boss thereby preventing rotation of said guide roller bracket.

19. The sliding side door of claim 18 wherein said ball-type roller depends from said bracket toward a horizontal support surface of the vehicle.

20. The sliding door of claim 18 wherein said guide roller is rotatable about a generally vertical axis and is received in a track mounted to the vehicle for guiding lateral movement of said door body.

* * * * *